United States Patent Office 2,818,316
Patented Dec. 31, 1957

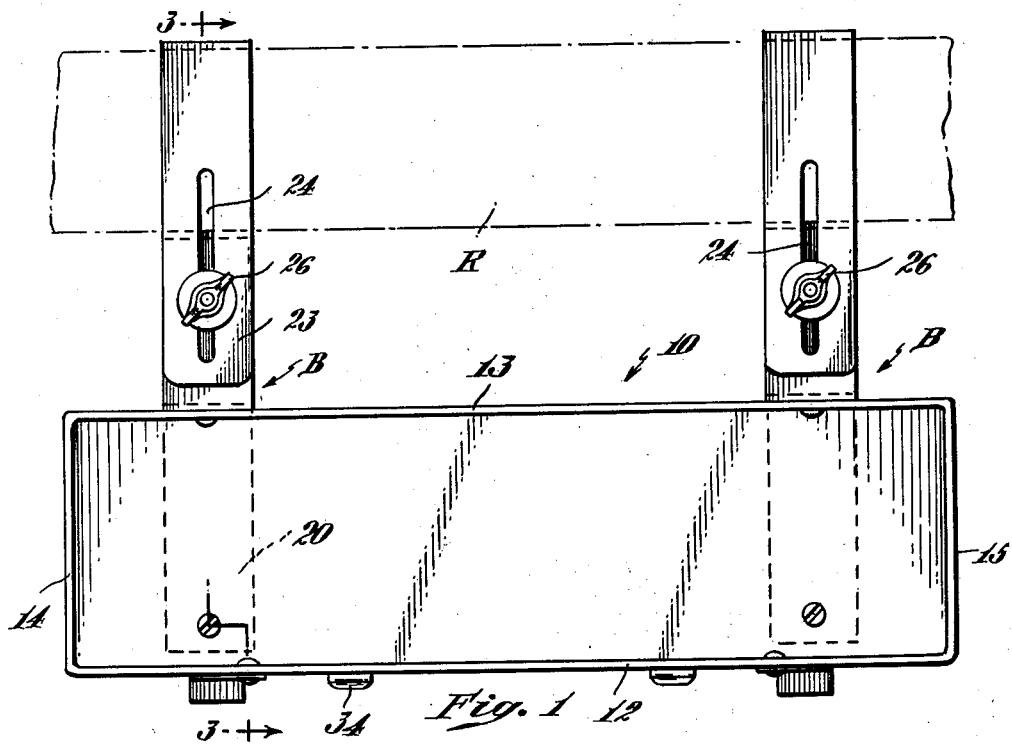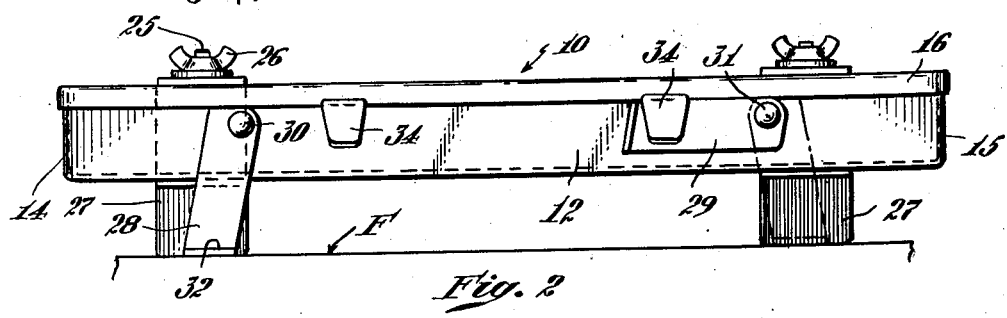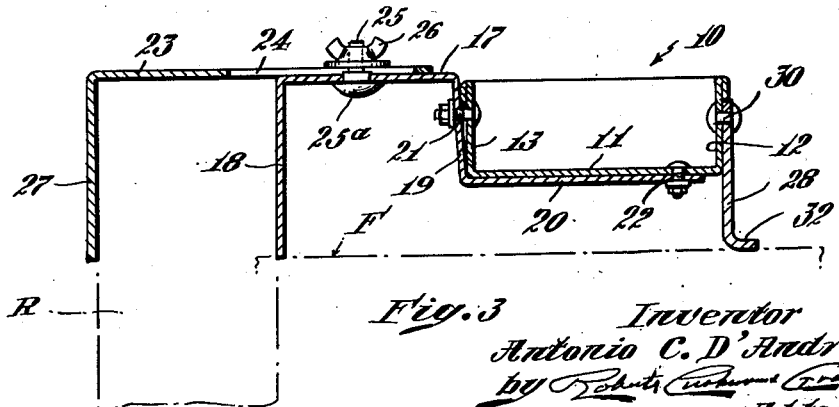

2,818,316

TOOL-HOLDING TRAY FOR USE BY AUTOMOBILE MECHANICS

Antonio C. D'Andrade, New Bedford, Mass.

Application August 10, 1956, Serial No. 603,298

3 Claims. (Cl. 311—21)

This invention pertains to supports, more especially to a tool tray designed for use by automobile mechanics or others having occasion to use tools in repairing or adjusting the parts of a motor vehicle.

It is a common experience with those who are employed in the repair of motor vehicles—a type of work which involves the use of a wide assortment of small tools such as wrenches, screw drivers, pliers, drills, etc.—to misplace or lose such tools during the progress of the work. The loss of tools in this particular trade is due, to a great extent, to the fact that much of the work is done beneath the hood of the vehicle or beneath the vehicle itself and in difficultly accessible or poorly lighted locations, such that when a tool is laid down, it is very easy to overlook it. The replacement of lost tools represents a substantial item of expense in the operation of a repair shop or the like, while the loss in productive time in looking for misplaced tools is likewise a substantial factor in operating expense. Moreover, since small parts removed from the motor vehicle during the progress of repairs are often oily or greasy and the tools themselves are often smeared with dirty grease, it is undesirable to lay them down on exposed portions of the motor vehicle, for instance the fenders, which thus become soiled with the greasy material.

A principal object of the present invention is to provide a tool holder, here illustrated as a shallow tray, suitable to hold the customary tools employed in motor vehicle repair as well as small parts which may be removed during the progress of repair, the tray being so designed that it may readily be mounted on a motor vehicle of almost any make and in a position such that the worker may conveniently place his tools in the tray during the progress of the work, and readily remove them from the tray for further use. Another object is to provide a tool tray having means for attaching it to the upper part of the radiator of the motor vehicle, after the hood has been opened. Since the concealed portion of the radiator is a part which is not finely finished, its appearance is not hurt by the application of the tray thereto, the tray having provision whereby it may easily be attached to the radiator or as readily removed when it is no longer needed. A further object is to provide a tool-holding tray having means for attaching it to the radiator of an automobile, and which also comprises means for alternatively holding it level in a somewhat elevated position on a floor or other horizontal support, for instance to facilitate its use while repair work is being done beneath the vehicle body. A further object is to provide a tool-holding tray of simple, inexpensive and durable construction.

Other and further objects and advantages of the invention will be pointed out in the following more detailed description and by reference to the accompanying drawings wherein Fig. 1 is a plan view of the tray of the present invention as it appears when attached to an automobile radiator, the latter being indicated in broken lines;

Fig. 2 is a front elevation of the tray of Fig. 1, but showing it as it might appear when setting on the floor; and Fig. 3 is a vertical section on the line 3—3 of Fig. 1, but showing in full lines, the position of the parts when the tray is resting upon a floor.

Referring to the drawings, the numeral 10 represents the tool-holding receptacle of the tray. As here illustrated, this receptacle is made of sheet metal of a suitable thickness to provide the desired rigidity. This tray has the bottom 11, the front wall 12, the rear wall 13, and the end walls 14 and 15. The upper edge of the tray is finished as here illustrated by folding down the metal to provide the double thickness at the margin 16.

However, a rolled edge, such as is commonly used in sheet metal work, may be employed. It is further contemplated that the receptacle may be of other material than sheet metal; for example, a suitable plastic. Merely by way of example and without limiting intent, the receptacle may be of a width of six inches from front to back; of a length of twenty inches; and a depth of two inches; the tray being open at its top to facilitate the placing of tools or other parts therein. For holding the tray in operative position, it is provided with two brackets B (Fig. 1) which may be made of sheet material similar to that of the receptacle, but in any event, of sufficient stiffness to hold the tray in proper position for use. Each bracket, as here illustrated, comprises a horizontal portion 17 which merges at its rear edge with a vertical portion 18 constituting one of the clamping jaws. As here illustrated, the parts 17 and 18 are integrally joined. A second downwardly directed part 19 is attached to the forward edge of the horizontal member 17, here shown as integral with the latter, and a second horizontal part 20, joined to the lower edge of the part 19, is arranged to underlie the bottom 11 of the tray. Desirably, the vertical parts 18 and 19 are spaced apart a substantial distance, for instance four inches so that when the tray is in use, the receptacle will be forward of the radiator. The parts 19 and 20 are secured to the rear wall 13 and to the bottom 11 of the tray, respectively, by bolts 21 and 22, or by other fastening means, for example rivets or spot welding as may be preferred.

With each bracket, there is associated a clamping member comprising the horizontal part 23 (Fig. 3), having an elongate slot 24 which receives a bolt 25 provided with a wing nut 26. This bolt has a head 25ᵃ at its lower end and passes up through a hole in the horizontal member 17 of the bracket. By means of this bolt and the slot 24, the clamping member 23 may be adjusted from front to rear and held in adjusted position. Each clamping element has a downwardly directed part 27 at its rear end, here shown as integral with the part 23, the part 27 constituting the second clamping jaw. In use, the jaw 27 is disposed against the rear surface of the radiator R, while the jaw 18 is disposed against the front surface of the radiator. To avoid possibility of damage to the radiator, it is desirable that the jaws 18 and 27 be of substantial width transversely. A width of two inches is cited as providing the desired margin of safety. In order to provide a good supporting bearing for the tray, it is desirable that the brackets B be spaced apart a substantial distance, a distance of twelve inches between their proximate edges is suggested as desirable although not limiting.

In the use of the device as thus far described (it being understood that the hood of the motor vehicle has been opened), the wing nuts 26 are loosened so that the rear clamping jaws 27 may be pushed far enough away from the front jaws 18 to permit the jaws to be slipped down over the upper part of the radiator. The jaws are then adjusted until they bear against the opposite faces of the radiator and then the wing nuts are tightened. It will be noted that the jaws 18 and 27 are of substantial depth, for example four inches, so that they extend down below the level of the bottom 11 of the receptacle. On the assumption that the jaws 18 and 27 are substantially rigid and have been placed in firm contact with the front and rear surfaces of the radiator and fixed in position, the tray will be supported with such rigidity that it will not be deflected to any substantial degree when holding any such assortment of tools and parts as might ordinarily be expected to be placed therein. Since the tray is relatively shallow, although of substantial transverse length, it is very easy to place tools or parts therein and to find such tools or parts when they are again to be used.

Since at times it is convenient to place the tray on the floor, and since the lower ends of the clamping jaws 18 and 27 are below the level of the bottom 11 of the tray, the present invention contemplates the provision of supporting means at the forward part of the receptacle extending down to the same level as the lower ends of the jaws 18 and 27. Thus, as here illustrated, the tray is provided with two legs 28 and 29 which are attached to its front wall 12 and preferably located at points opposite to the respective brackets B. Each leg, as here shown, consists of a piece of stiff sheet material, the legs being secured to the front wall 12 by rivets 30 and 31 respectively. These rivets constitute pivots about which the legs may be swung from the operative position of leg 28, as shown in full lines in Figs. 2 and 3, to the inoperative position of leg 29 as shown in full lines in Fig. 2. Each leg is preferably provided with a foot 32 whose lower surface is in the same plane as the lower ends of the clamping jaws 18 and 27. By turning both of these legs downwardly to the position of leg 28 (Fig. 3), the tray is provided with supports both at front and rear (that is to say, the legs and the clamping jaws 18 and 27) which may be set on a horizontal support such as the repair shop floor, and which will then hold the tray in horizontal position somewhat elevated above the floor. When not in use, the legs 28 and 29 are turned upwardly to the horizontal position of leg 29 as shown in full lines in Fig. 3; and, they may be held in this position by spring clips 34 or other convenient means.

While one desirable embodiment of the invention has herein been illustrated and described by way of example, it is to be understood that the invention is broadly inclusive of any and all modifications falling within the scope of the appended claims.

I claim:

1. A tray for holding tools employed in repairing a motor vehicle, said tray comprising a shallow, open-topped receptacle having a bottom and upright side and end walls, a pair of rigid brackets fixed to the receptacle, said brackets being spaced apart longitudinally of the receptacle and each bracket consisting of a unitary piece of stiff sheet metal and each comprising a horizontal, rearwardly directed portion and a downwardly directed rear portion, a rigid clamping element associated with each respective bracket, each clamping element consisting of a unitary piece of stiff sheet metal and comprising a horizontal portion provided with an elongate slot and which normally overlies the horizontal portion of the corresponding bracket, and a bolt, having a wing nut, which extends through a hole in the horizontal element of the bracket and through the slot in the clamping element, whereby the clamping element may be adjusted from front to rear relatively to the bracket and held in adjusted position, each clamping element having a vertical downwardly directed portion, the downwardly directed portions of the bracket and clamping element extending down below the level of the bottom of the receptacle and constituting radiator gripping jaws designed to contact the rear and front surfaces, respectively, of the vehicle radiator, said jaws being of a depth of approximately four inches and being operative to hold the receptacle in horizontal position forwardly of the radiator, each bracket comprising a second downwardly directed portion extending down from the forward edge of its aforesaid horizontal portion, said second downwardly directed portion being of a depth approximately equal to the height of the rear wall of the receptacle and merging at its lower edge with a forwardly directed horizontal portion which underlies the bottom of the receptacle, and means rigidly securing the second-named, downwardly directed portion of the bracket and the last-named horizontal portion of the bracket respectively to the rear wall and to the bottom of the receptacle.

2. A tool-holding tray according to claim 1 having a pair of legs secured to the front wall of the receptacle, said legs, when in operative position, having their lower edges in the same horizontal plane as the lower edges of the radiator gripping jaws and cooperating with the radiator gripping jaws to support the receptacle in elevated position above a horizontal surface, the legs being pivotally attached to the forward wall of the receptacle to permit them to be swung up to an inoperative position above the level of the bottom of the receptacle, and means for releasably retaining the legs in said inoperative position.

3. A tray for holding tools employed in the repair of a motor vehicle, said tray comprising a unitary, rigid, shallow, open-topped, transversely elongate receptacle, having a bottom, and side and end walls, said receptacle being of approximately twenty inches in length, six inches in front-to-rear width, and two inches in depth, and adjustable clamping means engageable with the upper portion of the radiator of the motor vehicle for supporting the receptacle in horizontal position forwardly of the radiator, said clamping means comprising two brackets, each fixedly secured to the receptacle with their proximate edges spaced apart a distance of approximately twelve inches, each bracket being a unitary length of stiff sheet metal of approximately two inches in width and comprising a vertical portion constituting a clamping jaw for contact with the forward face of the radiator, and a horizontal portion which lies in approximately the same horizontal plane as that of the upper edges of the receptacle, each bracket comprising a second vertical portion spaced forwardly from its clamping jaw a distance of approximately four inches and which contacts the rear wall of the receptacle, each bracket having a second horizontal portion extending forwardly from the lower edge of its second vertical portion and which underlies the bottom of the receptacle, means rigidly uniting the receptacle to said second-named vertical and horizontal portions of each bracket, a clamping device attached to each respective bracket, each clamping device consisting of a unitary length of stiff sheet metal and comprising a vertical portion constituting a second clamping jaw designed to engage the rear face of the radiator and a horizontal portion arranged in contact with the first-named horizontal portion of the corresponding bracket, and means for adjustably connecting the last-named horizontal portion of each bracket with the horizontal portion of the corresponding clamping device whereby the jaws of each pair may be relatively disposed to receive the radiator between them thereby to support the receptacle in the position of use.

References Cited in the file of this patent

UNITED STATES PATENTS

| | | |
|---|---|---|
| 1,288,560 | Gordon | Dec. 24, 1918 |
| 1,436,601 | Niemeyer | Nov. 21, 1922 |
| 1,641,358 | Smyser | Sept. 6, 1927 |
| 2,002,328 | Mitchell | May 21, 1935 |
| 2,584,557 | Cuthbertson | Feb. 5, 1952 |
| 2,640,597 | Thomson | June 2, 1953 |
| 2,721,777 | Willis | Oct. 25, 1955 |
| 2,741,521 | Bell et al. | Apr. 10, 1956 |